(12) United States Patent
Spohn et al.

(10) Patent No.: US 7,338,574 B2
(45) Date of Patent: Mar. 4, 2008

(54) MULTILAYER COMPOSITE AND METHOD OF MAKING SAME

(75) Inventors: Peter D Spohn, Brookline, NH (US); Frank M Keese, Cambridge, NY (US); Mark W Sinofsky, Bedford, NH (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 654 days.

(21) Appl. No.: 10/436,827

(22) Filed: May 13, 2003

(65) Prior Publication Data

US 2004/0229043 A1    Nov. 18, 2004

(51) Int. Cl.
*B32B 37/00* (2006.01)

(52) U.S. Cl. .................................. 156/246; 156/247
(58) Field of Classification Search ............... 156/246, 156/247, 272.2, 272.6, 273.3, 227
See application file for complete search history.

(56) References Cited

U.S. PATENT DOCUMENTS

| | | | | |
|---|---|---|---|---|
| 2,852,811 A | * | 9/1958 | Petriello ..................... 264/39 |
| 2,906,658 A | | 9/1959 | Doban ........................ 154/139 |
| 2,977,336 A | * | 3/1961 | Blatz .......................... 428/331 |
| 3,630,802 A | | 12/1971 | Dettling ...................... 156/231 |
| 3,650,880 A | * | 3/1972 | Tieniber ...................... 442/76 |
| 3,788,106 A | | 1/1974 | True ............................ 68/5 D |
| 3,990,932 A | | 11/1976 | Dupire ........................ 156/230 |
| 3,991,257 A | | 11/1976 | Mayer et al. ................ 428/921 |
| 4,123,313 A | | 10/1978 | Queen et al. ............... 156/498 |
| 4,139,591 A | | 2/1979 | Jurisich ...................... 264/257 |
| 4,233,358 A | * | 11/1980 | Jones et al. .................. 442/86 |
| 4,248,652 A | | 2/1981 | Civardi et al. .............. 156/219 |
| 4,275,104 A | | 6/1981 | de Nagybaczon ........... 428/195 |
| 4,543,145 A | | 9/1985 | Schnell et al. .............. 156/231 |
| 4,555,543 A | * | 11/1985 | Effenberger et al. ........ 524/520 |
| 4,623,574 A | * | 11/1986 | Harpell et al. .............. 428/113 |
| 4,698,110 A | | 10/1987 | Vassiliou .................... 156/231 |
| 4,702,956 A | | 10/1987 | Wilson et al. .............. 428/251 |
| 4,770,927 A | | 9/1988 | Effenberger et al. ........ 428/245 |
| 4,816,330 A | | 3/1989 | Freund et al. .............. 428/286 |
| 4,883,716 A | | 11/1989 | Effenberger et al. ........ 428/421 |
| 4,943,473 A | | 7/1990 | Sahatjian et al. ........... 428/245 |
| 5,075,065 A | * | 12/1991 | Effenberger et al. ........ 264/213 |
| 5,328,510 A | | 7/1994 | Hofmann et al. ........... 118/101 |
| 5,472,541 A | | 12/1995 | Simmons et al. ........... 156/231 |

(Continued)

OTHER PUBLICATIONS

Abstract: XP-002303360 Japanese Patent Publication JP 4090307, Mar. 24, 1992.

(Continued)

*Primary Examiner*—Jeff H. Aftergut
(74) *Attorney, Agent, or Firm*—Jeffrey C. Lew

(57) ABSTRACT

A multilayer composite has a generally adhesion resistant, protective layer and an adjacent second polymeric film. The composition of the protective layer includes a fluoropolymer and the second polymeric film is a polymer free of fluoropolymer. The size of the protective layer facing the second polymeric layer is rendered bondable to the non-fluoropolymer of the second polymeric layer prior to assembling the layers in the composite. The composite is well adapted to being produced in a vertical coating tower. The tower utilizes a carrier web onto which the fluoropolymer layer and second polymeric layer are deposited from respective casting films. Mirror image composites can be formed simultaneously on opposite sides of the carrier web.

11 Claims, 4 Drawing Sheets

U.S. PATENT DOCUMENTS

| | | | |
|---|---|---|---|
| 5,490,893 A | 2/1996 | Enlow et al. | 156/230 |
| 5,759,924 A | 6/1998 | Sahlin | 442/60 |
| 5,893,957 A | 4/1999 | Suzuki | 156/230 |
| 6,001,207 A | 12/1999 | Enlow et al. | 156/230 |
| 6,060,135 A * | 5/2000 | Service | 428/31 |
| 6,086,699 A | 7/2000 | Nakashima et al. | 156/230 |
| 6,348,117 B1 * | 2/2002 | Tribo et al. | 156/245 |
| 6,376,033 B1 | 4/2002 | Sonobe et al. | 428/34.7 |
| 6,383,325 B1 | 5/2002 | Tsai | 156/237 |
| 2003/0199215 A1 * | 10/2003 | Bhatnagar et al. | 442/135 |

OTHER PUBLICATIONS

Abstract: XP-002303361 Japanese Patent Publication JP 6016856, Apr. 1, 1994.

* cited by examiner

US 7,338,574 B2

MULTILAYER COMPOSITE AND METHOD OF MAKING SAME

FIELD OF THE INVENTION

This invention relates to a composite material having a very thin exposed first polymeric layer of a fluoropolymer composition bonded to a second polymeric layer of a composition substantially free of fluoropolymer. More specifically, the invention relates to a multilayer composite comprising a fluoropolymer protective layer thinner than about 51 μm (2 mils) and a second polymeric layer formed and bonded to the protective layer by curing a fluoropolymer-free, liquid silicone elastomer. The composite can have an optional fabric or film reinforcement layer adjacent or embedded in the second polymeric layer.

BACKGROUND OF THE INVENTION

Many commercially available curable liquid rubber polymer compositions exhibit a wide range of useful mechanical, physical and electrical bulk properties. Additionally these compositions can be provided at relatively low cost. There is a continuing need for materials with such useful properties in diverse applications which also require superior surface properties such as exceptional weatherability, superior fire resistance, enhanced solvent resistance, durable hydrophobicity and good release properties. Such superior surface properties are generally lacking in low-cost, curable liquid rubber compositions but are typically exhibited by more-costly halogen-containing polymers, especially fluoropolymers.

For many years technologists have tried to develop methods of bringing together the useful properties of inexpensive fluorine-free polymers with the surface properties of fluoropolymers. One technique involves laminating a fluoropolymer layer to a non-fluoropolymer layer to form a multilayer composite. Unfortunately and ironically, the highly prized surface properties which make fluoropolymers poorly adherent to dissimilar materials also causes the desirable laminar composites of fluoropolymers and non-fluoropolymers to exhibit low interfacial peel strength and a tendency to delaminate.

U.S. Pat. No. 5,916,659 of Koerber et al. discloses composites of fluoropolymers with non-fluoropolymers and a method of forming such composites. The disclosure calls for laminating onto opposite faces of a non-woven, fibrous binder, a layer of fluoropolymer and a layer of non-fluoropolymer such that a portion of the cross-sectional thickness of the non-woven binder is embedded into the fluoropolymer layer and a part or all of the remaining portion of the cross-sectional thickness of the binder is embedded into the non-fluoropolymer layer.

The fluoropolymer component typically is the overwhelmingly highest unit cost material of the composite. Also, the properties provided by the fluoropolymer can usually be adequately imparted to the product by an extremely thin coating of fluoropolymer on the surface of the composite. Therefore, there is a forceful motivation to use as little fluoropolymer in as thin a layer as possible.

Generally conventional composites and methods of fluoropolymer and non-fluoropolymer layers utilize fluoropolymer layers formed from thick films of greater than 51 μm (2 mils) thickness. Film of less thickness is usually too weak to be self-supporting or to withstand normal manipulation experienced during the fabrication of the composite. Thin film can be produced by carefully skiving sections from a fluoropolymer billet, however this is a very difficult procedure to carry out successfully. Naturally, these thin films are extremely delicate and must be handled with extreme care to maintain their structural integrity.

Consequently, there is a need for a laminar composite of non-fluoropolymer bonded strongly to a layer of fluoropolymer of uniform thickness of 50 μm or less. It is also desirable to have a method of making such a laminar composite in a simple, highly productive and cost effective manner. Composites of this structure would find potential use in diverse applications such as waste pond liners, mold release liners, molded gas tanks, conveyor belts, grill sheets and belts, insulation covering for aerospace application products, and exterior and interior architectural components, for example, roofs and walls.

SUMMARY OF THE INVENTION

Accordingly, the present invention now provides a multilayer composite comprising
  (a) a protective layer consisting essentially of a fluoropolymer defining a first side treated to render the protective layer bondable to a polymer free of fluoropolymer, the protective layer having a thickness of about 5-51 μm (0.2-2 mil), and
  (b) a second polymeric layer adhered to the protective layer in direct contact with the first side and having a composition substantially free of fluoropolymer.

There is also provided a process for making a multilayer composite comprising
  (A) providing a uniform dispersion in a liquid medium of particles of a fluoropolymer having a fusing temperature,
  (B) depositing the dispersion onto a carrier web of a material that is thermally stable above the fusing temperature,
  (C) heating the carrier web coated with the dispersion to a temperature above and for a duration effective to remove the liquid medium and to a temperature above the fusing temperature to form a continuous, uniform thickness, protective layer of fluoropolymer film on the carrier web of which the protective layer has an inboard face adjacent to the web and an outboard face opposite the carrier web,
  (D) optionally applying additional dispersion onto the outboard face and heating the web and dispersion to a temperature above the fusing temperature for a duration effective to remove additional liquid medium and to build up thickness of the film of the protective layer,
  (E) optionally repeating step (D) until the protective layer is a preselected thickness,
  (F) treating the protective layer such that the outboard face is bondable to a polymer free of fluoropolymer,
  (G) while maintaining the inboard face of the protective layer in contact with the carrier web, applying to the outboard face a second polymeric layer of a composition substantially free of fluoropolymer,
  (H) bonding the second polymeric layer to the outboard face of the protective layer, thereby forming a multilayer composite of the protective layer bonded to the second polymeric layer, and
  (I) peeling the multilayer composite from the carrier web.

DETAILED DESCRIPTION

Figure 1:
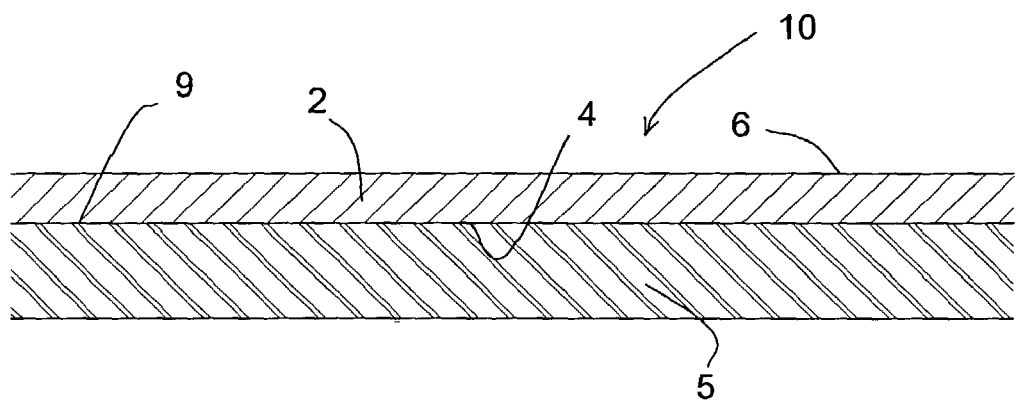
FIG. 1 is a section view of an embodiment of a multilayer composite according to the present invention.

Basic aspects of the laminar composite of this invention can be readily understood with reference to FIG. 1. This figure illustrates a two-layer composite 10 which comprises a protective layer 2 of a polymer composition and a second polymeric layer 5 in direct contact with the protective layer. The composition of the protective layer comprises fluoropolymer and the composition of the second polymeric layer also comprises polymer but is substantially free of fluoropolymer. By "substantially free" is meant that there can be minor contamination of the second polymeric layer, that is, less than about 1 wt. %. More particularly, the second polymeric layer comprises a major fraction, and preferably greater than about 90 wt. % of one or more polymer components and complementary minor fractions of one or more adjuvants such as fillers, pigments, product performance enhancement additives, process aids and the like. The polymer components which constitute the major fraction of the second polymeric layer are not fluoropolymer composition. The adjuvants can include fluorine-containing and fluoropolymer components. For example, certain lubricating agents can be fluoropolymers.

The protective layer and the second polymeric layer are bonded to each other at the interfacial boundary 9. Due to the dissimilarity between their respective fluoropolymer and the non-fluoropolymer compositions, the protective layer and second polymeric layer are not inherently adapted to create a strong bond at the boundary. Therefore, the face 4 of the protective layer on the side to be bonded to the second polymeric layer is treated in a suitable manner to render the two layers bondable before bond is created.

Various methods are available for making the face of protective layer bondable. For example the face can be chemically etched. This is done by etching processes well known in the industry that typically involve contacting the surface intended to be made bondable with an etching composition, for example, sodium metal/napthalene/glycol ether mixture, sodium metal/anhydrous ammonia mixture and the like. Other representative available methods of making a fluoropolymer surface bondable include electrochemical treatments, metal sputtering and deposition of minute amounts of metals and/or metal oxides, such as chemical vapor deposition and physical vapor deposition techniques.

In a preferred method of bonding, face 4 of the protective layer is impregnated with particles of reactive or high surface energy composition. For example, colloidal silica can be used. Impregnation can be accomplished by dispersing particles uniformly throughout the fluoropolymer composition from which the side of the protective layer exposed to the second polymeric layer is made prior to forming the protective layer itself. When the protective layer is produced, a fraction of the particles will be at the surface of the layer, i.e., at face 4. The particles are bondable with many other non-fluoropolymer compositions. Silicone elastomer is a preferred non-fluoropolymer suitable for use as the second polymeric layer 5. Preferably colloidal silica particles embedded in and present at the face 4 of the protective layer 2 are ideally suited to chemically bond to silicone elastomer. Treating the face 4 with colloidal silica particles thus makes the side of the protective layer bondable to silicone elastomer of the preferred composition, second polymer layer.

Colloidal silica particles suitable for use in this invention generally have a particle size in the range of about 5-100 nm, and preferably, about 15-45 nm. Preferably, good surface density of silica particles on the treated face 4 of the protective layer is achieved when the concentration of colloidal silica particles is controlled within the range of about 25-75 wt. % of the protective layer, and more preferably about 50-70 wt. %. An example of colloidal silica suitable for use in this invention is available from W. R. Grace Company under the tradename "Ludox".

The thickness of the protective layer is usually the same or less than that of the second polymeric layer. In most utilities, the protective layer is much thinner than the polymeric layer. The thickness of the second polymeric layer is routinely more than about two times, and preferably more than about four times the thickness of the protective layer. The protective layer thickness is generally about 5-50 μm, preferably about 5-25 μm, and more preferably about 10-20 μm.

The protective layer is composed substantially completely of fluoropolymer. By "substantially completely" is meant that the layer is composed largely but not necessarily wholly of fluoropolymer. Preferably at least the major fraction, i.e., greater than 50 wt. %, of the protective layer is fluoropolymer. More preferably the protective layer comprises greater than about 75 wt. % fluoropolymer and most preferably greater than about 90 wt. %.

Other components of the protective layer can include inert fillers, light stabilizers, such as ultraviolet light absorbing additives, pigments, bonding aids, such as colloidal silica particles, and the like. Fillers are sometimes used to dilute the fluoropolymer concentration and thereby reduce the overall cost of the composite. Representative fillers suitable for use in the invention include talk, silica and calcium carbonate. Light stabilizers are used to improve weatherability of the protective layer and to increase protection of the underlying second polymeric layer from prolonged exposure to solar or artificial radiation such as ultraviolet light. Representative ultraviolet light absorbing additives and pigments suitable for use in this invention include $TiO_2$, $Fe_2O_3$, carbon black and calcined mixed metal oxides. Bonding aids are added to the fluoropolymer to render the face of the protective layer on the side joining the second polymeric layer bondable to the latter as discussed above.

The term fluoropolymer means a hydrocarbon backbone polymer in which some or all of the hydrogen atoms are substituted with fluorine atoms. Usually the backbone polymer is polyolefinic formed from fluorine-substituted, unsaturated olefin monomers. The fluoropolymer can be a homopolymer of such fluorine-substituted monomers or a copolymer of exclusively fluorine-substituted monomers or mixtures of fluorine-substituted monomers and non-fluorine-substituted monomers. Along with fluorine atoms, the fluoropolymer can also be substituted with other halogen atoms such as chlorine and bromine atoms. Representative of monomers suitable for forming fluoropolymers for use in this invention are tetrafluoroethylene ("TFE"), vinylidene fluoride ("VF2"), hexafluoropropylene ("HFP"), chlorotrifluoroethylene ("CTFE"), perfluoroethylvinyl ether ("PEVE"), perfluoromethylvinyl ether ("PMVE"), perfluoropropylvinyl ether ("PPVE"). Examples of suitable fluoropolymers include polytetrafluoroethylene ("PTFE"), (perfluoroalkylvinyl ether) ("PFA"), fluorinated ethylene-propylene copolymer ("FEP"), ethylene-tetrafluoroethylene copolymer ("ETFE"), polyvinylidene fluoride ("PVDF"), polychlorotrifluoroethylene ("PCTFE"), and TFE copolymers with VF2 and/or HFP.

The second polymeric layer comprises primarily a polymer other than a fluoropolymer, i.e., a "non-fluoropolymer". The composition of the non-fluoropolymer is selected to provide bulk physical properties desired to be obtained from the composite. Representative non-fluoropolymers suitable for use in the invention include polyorganosiloxane (often also referred to herein as "silicone rubber"), polyolefins, polyurethane ("PUR"), ethylene propylene diene monomer ("EPDM") polymers, and mixtures thereof.

A novel process for making the multilayer composite will be explained in detail below. The multilayer composite can be produced by the novel process in such a manner that the surface of the second side 6 of the protective layer, i.e., the side opposite the second polymeric layer, has a very glossy finished appearance. Surface gloss can be measured by various techniques, typical of which is ASTM D 3679-86. According to this method, surface gloss levels exhibited by the protective layer have a 75° gloss value of greater than about 50 gloss units.

Another distinctive feature provided by the novel process is that it enables the facile formation of the protective layer with a highly uniform thickness. Preferably, the cross section dimension of the protective layer will be so uniform that the layer thickness at any place on the composite does not differ from the maximum layer thickness by more than about 10% of the maximum thickness. Having the ability to create a uniform protective layer cross section of less than about 50 µm allows the fabricator another degree of control over the amount of fluoropolymer incorporated in the composite. This further assures that the composite can be made economically with a minimum thickness protective layer of fluoropolymer demanded by a particular application.

In another aspect, the multilayer composite can include an optional additional reinforcement layer. Among other desirable attributes, this layer provides increased lateral dimension stability, puncture and tear resistance, increased abrasion resistance and improved ability to carry static loads. In a preferred embodiment illustrated in FIG. 2, multilayer composite 20 is seen to have a protective layer 2 bonded at interfacial boundary 9 to a second polymeric layer 5. A third, reinforcement layer 22 is in contact with an exterior face 8 of the second polymeric layer. The illustrated reinforcement layer 22 is a woven web comprised of weft filaments 23 and warp filaments 24. Other structures for the reinforcement layer are contemplated. For example, the woven web can have different weaving patterns and knitted filaments. The reinforcement layer can also be non-woven web or a film. The film can be continuous or perforated.

In another preferred embodiment (FIG. 3) the multilayer composite 30 includes a reinforcement layer 32 embedded within the second polymeric layer 5.

The reinforcement layer can be any composition that adheres well to the second polymeric layer and has suitable mechanical properties mentioned above. The reinforcement layer can be an inorganic material such as metal and ceramic. Representative inorganic fibrous materials for the reinforcement layer include carbon fiber, metal filament, such as steel and copper wire, ceramic filaments such as glass fibers, and blends thereof.

The reinforcement layer can have an organic composition and preferably is polymeric. Representative organic substances suitable for use in this invention include natural fiber selected from the group consisting of cotton, wool and blends thereof, and polymer selected from the group consisting of polyester, polyamide, polyaramid, polyimide, polyolefin, and blends or copolymers thereof.

Figure 4:
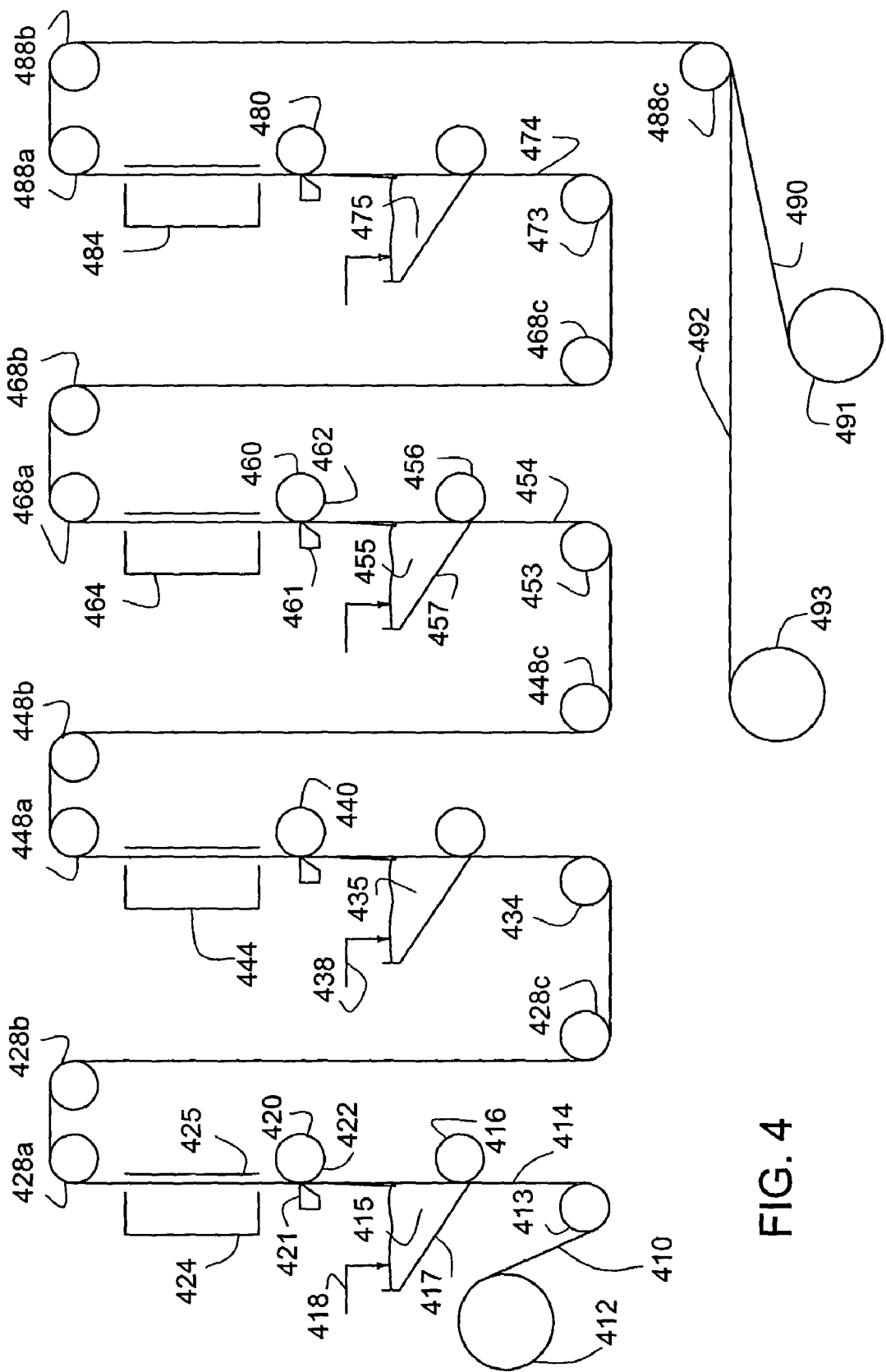
FIG. 4 is a schematic diagram of a process for making a multilayer composite on one side of a carrier web.

In another aspect the present invention is a process for making the novel multilayer composites mentioned above. An embodiment of this process can be understood with reference to the schematic flow diagram in FIG. 4 showing a cross section of the multilayer composite generally moving from left to right. A carrier web 410 is continuously unwound from storage and feed roll 412 and directed by guide roll 413 to the base of a first, preferably vertically oriented, coating tower assembly 414. The carrier web can be any flexible solid sheet material with adequate tensile strength to maintain its structural integrity when subjected to tension forces drawing the carrier web through the multiple coating stations as will be explained. The carrier web also must endure exposure to multiple temperature cycles. Representative materials suitable for use as the carrier web include stainless steel and polymers, such as polyimide and other engineering polymers that are serviceable at high temperatures. The thickness of the carrier web will depend to some degree upon the nature of the web material. Preferably the thickness of the web will be about 51-255 µm (2-10 mils).

After turning under the base of tower assembly 414 the carrier web is coated on one side with a suspension 415 fluoropolymer particles uniformly dispersed in a liquid medium. The coating occurs as the web travels between a positioning roller guide 416 and a tray 417 holding an inventory of the suspension 415. The positioning roller guide is biased against the web so that the web and the tray form a seal adequate to prevent the suspension from draining downward. Some of the suspension is dragged upward with the moving web and makeup suspension 418 from a supply source, not shown, is added from time to time or continuously to maintain an approximately uniform level of suspension in contact with the web. Above the coating tray the web passes to a metering unit 420. Conventional means for controlling the thickness of the film can be used. For example, the figure illustrates a doctor blade 421 set to a precise distance from the coated surface of the carrier web so that excess suspension is scraped from the web and returned to inventory in the suspension tray. The web is precisely laterally positioned against the doctor blade by roller 422. Rather than roller 422, the positioning device could be a smooth flat vertical plate directing the web toward the doctor blade. Another exemplary device suitable for metering is a set of cylindrical rods on opposite sides of the carrier web and positioned so that the nip between the rods defines the desired coating thickness. The metering rods can be stationary or rotating. Optionally the rods can be wire wound as are used in conventional roller coating technology.

The wet-coated web next continues upward and passes through a thermal processing unit represented schematically by figure element 424. Frequently, all or a portion of the thermal processing occurs within an enclosure represented by the combination of elements 424 and 425. Several steps take place in the thermal processing unit. Firstly, liquid from the suspension medium is removed. That is, the coating is dried. This can be carried out at ambient or elevated temperatures. Drying conditions can optionally include blowing dry gas across the coated surface. Drying continues to provide a coating substantially completely free of gross, i.e., flowing or droplet formed liquid medium. This leaves the fluoropolymer in largely particulate form and loosely adhered to the web.

Secondly, the temperature is raised above the fusing temperature of the fluoropolymer. This is performed at a temperature and time effective to sinter the fluoropolymer particles and thereby form a cohesive and uniform thickness film of fluoropolymer on the web. The temperature can be raised with conventional techniques such as hot air convection utilizing electric or gas fired ovens and thermal radiation methods, for example, microwave heating.

Upon completion of the thermal processing the fluoropolymer has formed a structurally integrated protective layer with an inboard face adjacent to the web and an opposite outboard face. The thickness of the protective layer is uniform and its thickness dimension is defined by such factors as the settings of the metering unit and the concentration of the solids of suspension. Optionally, the thickness of the protective layer can be increased by repeating the coating process one or more times. This is represented in FIG. 4 by second tower assembly 434. That is, the carrier web with fluoropolymer film is directed by rolls 428a-428c, to the base of tower 434 where another coating of fluoropolymer suspension 435 is applied over the formerly outboard face of the first sintered coating of fluoropolymer. The suspension is metered in unit 440 and the additional coating or coatings of fluoropolymer are dried and sintered in system 444. This produces a protective layer with a built up thickness and an exposed outboard face opposite the web. Although only one additional coating tower assembly 434 is shown in FIG. 4, optionally, the fluoropolymer coating process can be repeated any number of times until the desired total thickness of the protective layer is attained.

Another unit operation that occurs during formation of the protective layer involves causing the fluoropolymer at the outboard face to be bondable to a polymer that is substantially free of fluoropolymer. Rendering the fluoropolymer bondable can be done in a variety of ways as have been mentioned above. By one technique the outboard face can be etched, for example by corona arc treatment. Because only the outboard face of the protective layer is to be made bondable, etching should be carried out in the unit represented by element 444 of the last of the fluoropolymer coating tower stages. According to another technique, particles of a reactive component such as colloidal silica particles are embedded into the outboard face of the protective layer to render the fluoropolymer bondable. Such incorporation can be accomplished by dispersing the reactive component particles into the suspension of fluoropolymer and liquid medium. Although the reactive component particles might be added in early coating stages, e.g., in dispersion supply 418 of first coating stage 414, preferably for sake of economy the particles are included only in the application of the outboard face, that is, with supply 438 for suspension 435 in the final fluoropolymer coating stage.

The next step of the process calls for adding and bonding a second polymeric layer onto the outboard face of the completed protective layer. As seen in FIG. 4, the carrier web with protective layer is directed by rolls 448a-c to a first stage 454 for depositing the second polymeric layer onto the composite. As before, the web and fluoropolymer are directed by a guide roll 453 vertically upward through the coating tower. The composite passes between the nip formed by biasing roll 456 and tray 457 where it contacts the liquid precursor form 455 of the second polymeric layer composition. The thickness of the second polymeric layer is adjusted by metering means 460. In the illustrated embodiment the metering device comprises backing roll 462 and doctor knife 461. The composite continues upward through the tower and enters a unit 464 that is operative to cure the liquid precursor of the second polymeric layer to a solid form. Typically, the curing step is activated by heat and therefore the curing unit 464 is operative to raise the temperature of the web to a curing temperature for a duration effective to solidify the second polymeric layer. Normally, the curing of the second polymeric layer composition also is effective to simultaneously bond this layer to the adjacent fluoropolymer composition at the formerly outboard face of the protective layer. Thus the composite 469 includes a finished thickness protective layer adjacent on its inboard face to the carrier web and bonded to a thickness of non-fluoropolymer, second polymeric layer.

If it is desired to build up the thickness of the second polymeric layer beyond that which is created in a single coating stage, one or more additional coating stages can be utilized. These are represented in FIG. 4 by tower assembly 474. Coating is added by directing the web around rollers 468a-c, and upward around roll 473. The composite passes through a coating stage where it picks up more liquid precursor of second polymeric composition 475. The liquid precursor is metered by means 480 and the precursor composition is cured by unit 484 as previously described. The completed composite 489 still is attached at the inboard face of the protective layer to the carrier web. Utilizing guide rolls 488a-c the carrier 492 and composite 490 are separated and individually wound up on spools 493 and 491 respectively. The composite should peel from the carrier web easily because the inboard face of the composite is a fluoropolymer composition which generally has a low surface energy and is resistant to adhesion to the carrier web composition. Carrier web 492 can be saved for re-use by transporting the wound up roll 493 to the position of carrier web supply 412.

Figure 5:
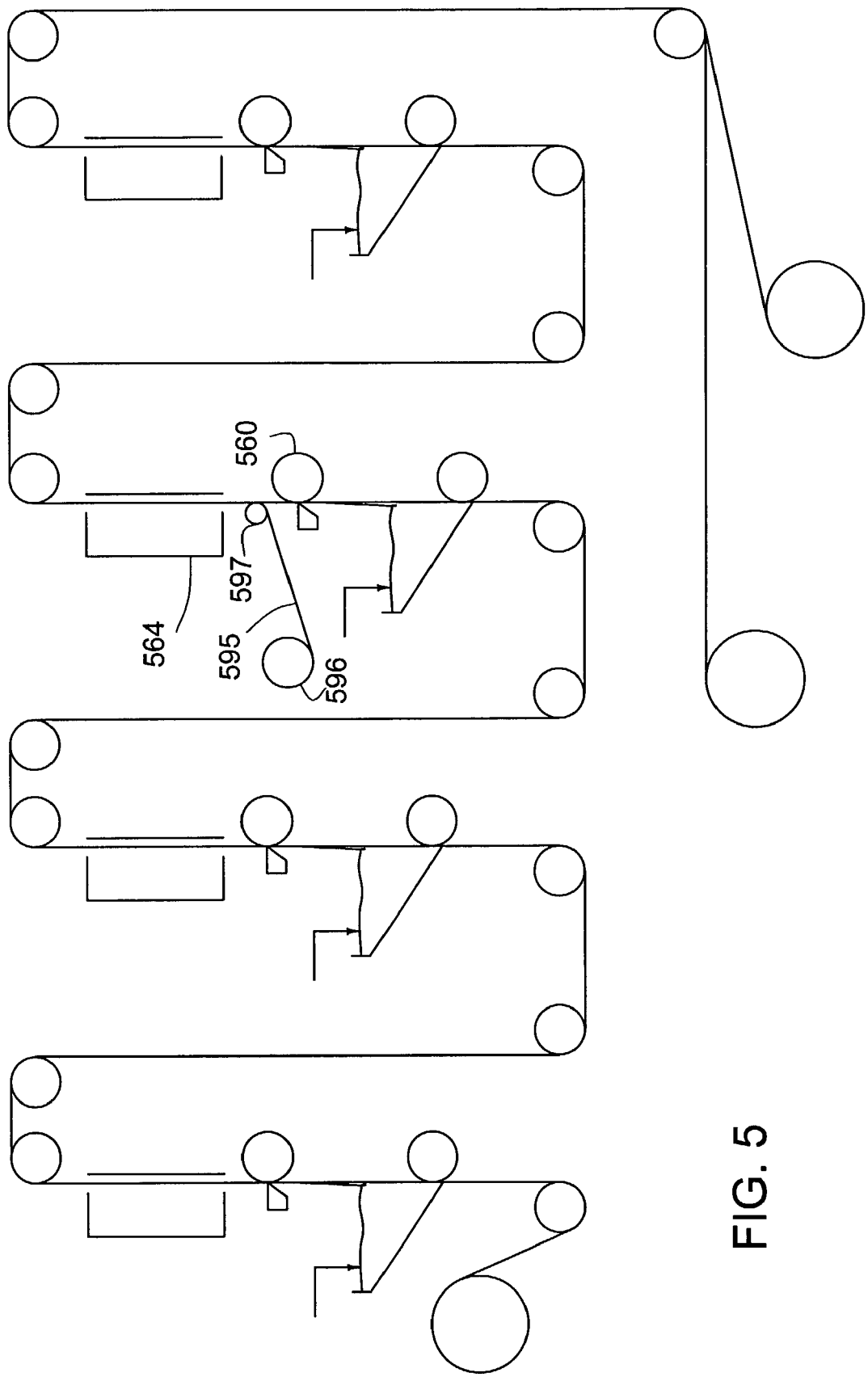
FIG. 5 is a schematic diagram of a process for making a multilayer composite having a reinforcement layer.

As shown in FIG. 5, another embodiment of the novel process incorporates the step of adding a reinforcement layer to the two layer composite. That is, a stock of reinforcement layer fabric 595 is supplied on a supply spool 596. As the carrier web with fused protective layer and coating of the liquid precursor composition of the second polymeric layer passes between the liquid precursor metering means 560 and the curing unit 564, the reinforcement layer is placed in contact with the liquid precursor composition. The fabric 595 can be laid on the exposed surface or embedded within the liquid precursor composition. Control of placement is made by the lateral position of setting roll 597.

In another preferred embodiment, the novel process can be adapted to coat two sides of a carrier web simultaneously. This embodiment advantageously provides that the product composite can be made at twice the speed as the single side coating embodiment. Also there are energy savings derived from the fact that one oven can be used to sinter the protective layers or cure the second polymeric layers on two sides of the carrier web with about the same amount of heat as necessary to sinter or cure a one sided film.

Figure 6:
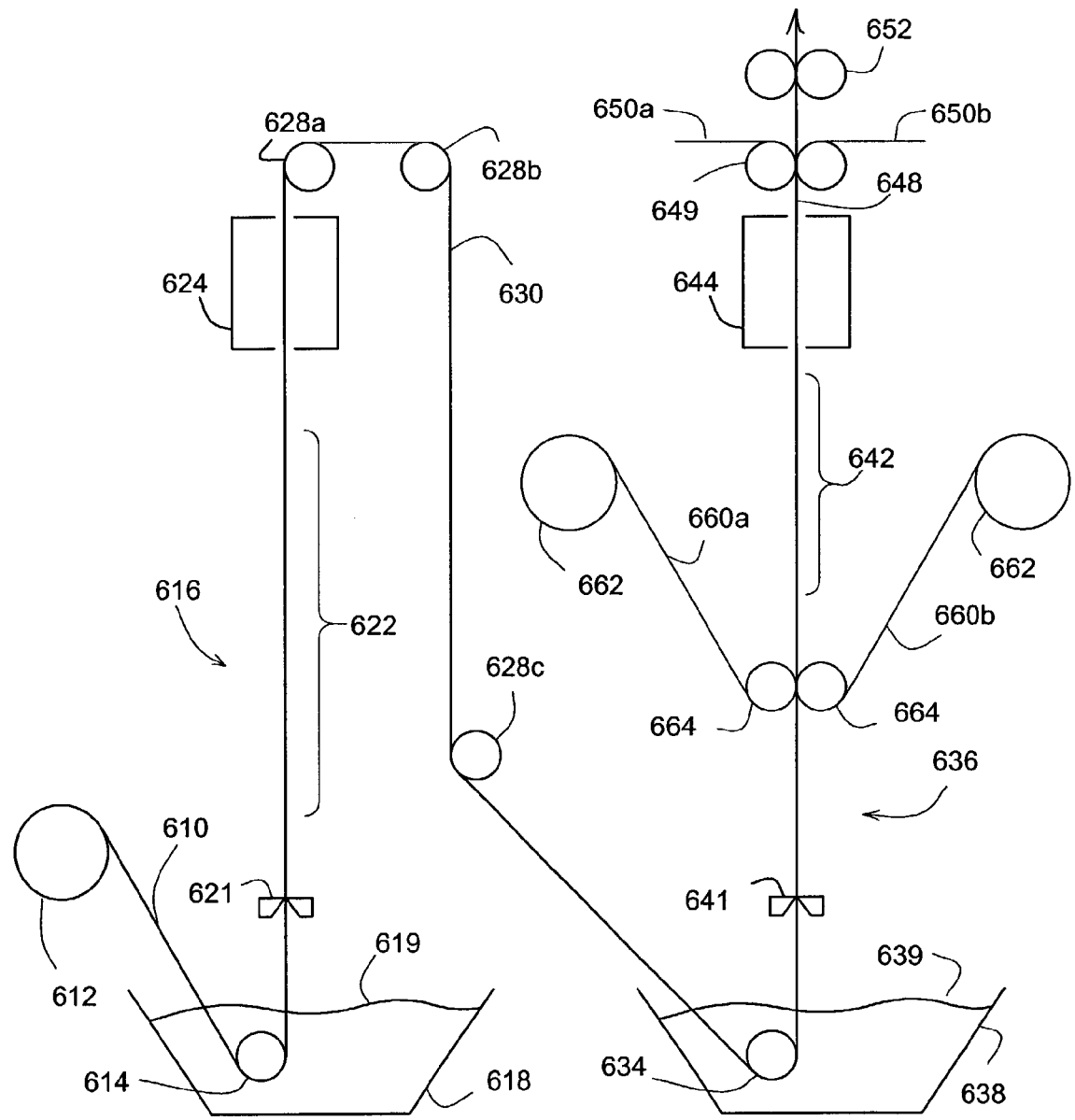
FIG. 6 is a schematic diagram of a process for making two multilayer composites simultaneously according to the present invention.

FIG. 6 illustrates a single coating tower assembly adapted to coat two sides of a carrier film. This apparatus bears certain similarities to the system described in U.S. Pat. No. 5,075,065 (Effenberger et al.), the entire disclosure of which is hereby incorporated herein by reference. The operation of the present process can in part be further understood with reference to the disclosure of the '065 patent. A roll of carrier web 610 is unwound from spool 612 and is directed by guide roll 614 to the base of a first coating tower assembly 616.

The guide roll is positioned inside a trough 618 which contains a suspension 619 of fluoropolymer particles uniformly dispersed in a liquid medium. As the suspension is taken up by the carrier, the suspension is replenished from a make-up supply source, not shown. The guide roll is placed below the surface of the suspension so that the carrier web becomes immersed in the suspension. As the web travels upward it emerges from the suspension and entrains on both sides a film of suspension. The wet web next passes through a pair of opposing metering devices, illustrated as doctor blades. The gap between the blades and the surfaces of the web are set to define a desired film coating thickness. Excess suspension drains downward and returns to the trough 618. The web proceeds upward through a drying section, indicated by bracket 622. Here some of the liquid medium is evaporated at ambient or slightly elevated temperature conditions. The carrier web with reduced liquid content on the surface enters drying and fluoropolymer sintering section 624. The dryer unit encompasses the carrier web and effects drying and sintering on both sides. During this step residual liquid medium is removed and the fluoropolymer is fused to a cohesive film by exposure to elevated temperature. At 630 as directed from the first coating tower assembly by rolls 628a-c the structure thus comprises two protective layers. Each protective layer has its inboard face in contact but not bonded to an opposite side of the carrier web.

If it is desired to increase the thickness of the protective layer, one or more additional fluoropolymer coating steps (not shown) can be optionally employed in sequence. As explained above, the final fluoropolymer coating step should include a substep in which the outboard face of the protective layer is rendered bondable to the second polymeric layer. This substep can be accomplished by adding a bonding agent, by etching the outboard face of the protective layer or by another technique known to those skilled in the art for making fluoropolymer bondable to non-fluoropolymer. For example, a bonding agent such as colloidal silica particles, can be added to the suspension of fluoropolymer in trough 618. Etching can be performed by continuously treating, such as by corona arc treatment, both outboard faces of the two protective layer films. Etching can be combined with thermal processing at positions 622 and 624.

The two protective layers on the sides of the carrier web 630 next are coated in another tower assembly 636 on with a liquid precursor composition 639 of the second polymeric layer. As above, this composition is a curable liquid containing a polymeric substance that consists essentially of non-fluoropolymer. The liquid is placed in trough 638 and is replenished from a supply source not shown. The carrier web descends into the inventory of liquid precursor composition by guide roll 634. The outboard faces of the now-fused protective layer entrain a film of the liquid precursor composition. The film is metered by devices 641 shown as opposing doctor blades. Excess precursor composition drains to trough 638.

The composite travels upward toward drying section 642 and curing section 644. While the composition of the second polymeric layer remains uncured, a reinforcement layer of fabric or film 660a, b is laid onto each side of the composite. The reinforcement layer fabric is simultaneously unwound from rolls 662 and pressed into contact with the nascent second polymeric layer by opposing rolls 664.

FIG. 6 depicts a single coating tower assembly 636 devoted to depositing the second polymeric layers onto the protective layers. If desired to increase the thickness of the second polymeric layer above that which can be provided by a single coating, one or more additional sequentially positioned towers can be optionally employed. Although a reinforcement layer can be incorporated within any one or more of the strata of the second polymeric layer, preferably the reinforcement layer will be added at the last coating tower assembly in the series.

It should also be noted that the reinforcement layers 660a and *b* or 595 (FIG. 5) can comprise monolithic or composite structures. That is, the layers can include one or more sublayers of fabrics or films applied contemporaneously in a single tower assembly. Moreover, fabrication of the composite optionally can asymmetric with respect to the reinforcement layers. That is the reinforcement layer composition 660a can be the same or different from that of 660b. This feature gives the fabricator of the multilayer composite further flexibility to produce multiple product compositions at the same time. For example, a reinforcement layer can be applied on only one side of the tower. This would simultaneously produce a fabric or film reinforced composite on one side and a non-reinforced composite on the other.

Figure 2:
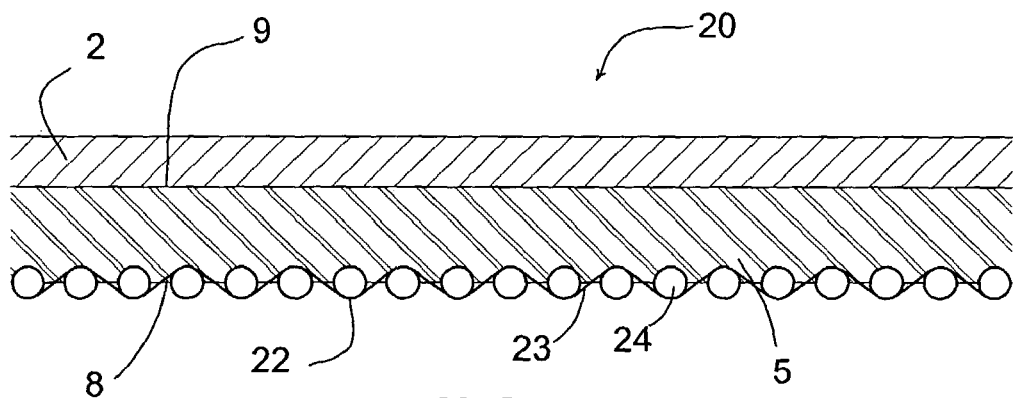
FIG. 2 is a section view of another embodiment of a multilayer composite according to the present invention.
Figure 3:
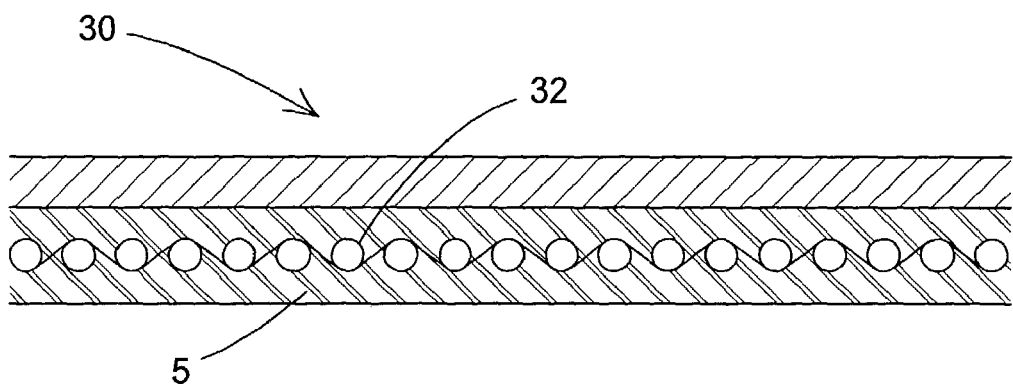
FIG. 3 is a section view of another embodiment of a multilayer composite according to the present invention.

With further reference to FIG. 6, it is seen that the reinforcement layers can be applied to the outer surface of the second polymer layers, as in FIG. 2, or embedded into the second polymer layers, as in FIG. 3. Either with or without a reinforcement layer, the composite proceeds through tower assembly 636 into drying unit 642 and curing unit 644

In these sections temperature profiles are maintained so as to respectively remove any residual solvent or diluent component in the liquid precursor composition and cure the composition to form a solidified second polymeric layer on both sides of the carrier web. At a convenient distance from the curing step 648, the two finished multilayer composites 650a and 650b can be peeled from the carrier web 610 as directed by rolls 649. Each product composite can then be wound up on a spool (not shown) for storage, transport and use. Carrier web 610 is moved separately utilizing rolls 652 to be wound up for storage and possible reuse. In a contemplated embodiment, not shown, carrier web can be a continuous belt of a single piece of construction. Thus it can be withdrawn from the end of the process by rolls 652 and returned by use of intervening conventional rolls and motivating devices to the first coating tower assembly position at roll 614.

The preferred materials for the carrier web in this invention are thin polymer films that exhibit low adhesion to the fluoropolymer of the protective layer and thereby better facilitate stripping of the film from the web. These materials also possess low thermal mass, facilitating rapid quenching. The carriers used in the invention also have good flexibility and may be tracked using rollers in contact with the surface of the coated carrier web. Thus these materials allow carrier web of a wide range of widths to operate continuously at high, i.e., commercially practical speed. Web speed is preferably 1-9 m/min. (3-30 fpm) and more preferably about 3-9 m/min. (10-30 fpm).

The actual choice of carrier for any given carrier web polymer is dictated by the highest process temperature it will encounter, the work of adhesion developed between the carrier and the protective layer surface in direct contact with it, and its chemical compatibility with the liquid medium. In general, the carrier should be of low thermal mass, dimensionally stable at the maximum processing temperature, chemically resistant to all components of the liquid media, and the work of adhesion between the deposited film and the carrier surface must not exceed the yield strength of the deposited protective and second polymeric layers. Once these conditions are satisfied, the actual selection of a carrier for any given product from all carrier web candidates is a matter of taking into account its useful life as well as its initial cost for the sake of economy.

Suitable carrier webs for casting of the invention multilayer composite according to this invention include:

a) Films of high melting thermoplastics, such as the thermoplastic polyimides, (e.g. Upilex® from ICI) polyether-ether ketones (e.g. STABAR® from ICI), polyaryl ketones from Union Carbide, polyphenylene sulfide (e.g. RYTON® from Phillips Corp.), and polyetherimides (e.g. ULTEM® from General Electric Co.). High melting perfluoropolymer films may themselves be used for casting a composite that includes a protective layer of certain lower melting, partially fluorinated copolymers, such as TFB 7100D (a terpolymer of VF2, TFE, and HFP) from Hoechst. A polyimide carrier web is preferred for highest melting perfluoropolymer (i.e., PTFE) protective layer. Such a web material is also suitable for casting TFE copolymers with PPVE such as Teflon® PFA.

b) Films of thermosetting plastics, particularly of the high temperature capable thermosetting resins such as polyimides (e.g. Kapton® H from DuPont) are particularly good carriers since they possess excellent high temperature thermal and dimensional stability as well as durable release characteristics. The surface free energy of the Kapton® H is reported to be about 45 to 55 ergs/cm, yet has somewhat surprisingly proven to be an excellent candidate for accepting the liquid media which typically have a surface tension of about 29 to 35 dynes/cm.

c) Coated or laminated textiles based upon the above thermoplastics or similar thermally stable resins and thermally stable reinforcements such as fiberglass, graphite, polyaramid (e.g. Kevlar®), and aromatic polyamide (e.g. Nomex®) yarns may also be used as a carrier to maximize dimensional stability at high temperature as opposed to an unsupported film.

d) Plastic Coated Metal Foil may be used as a carrier.

e) Metallized or Metal Foil Laminated Plastic Films may be used as carriers. Any of the acceptable plastics, or even elastomers, in thin sheet or film form could be metallized or laminated between very thin metal foils to provide good wettability and release properties. For example, a high temperature cured fluoroelastomer sheet as thin as about 50 μm (about 2 mil) form sandwiched between thin aluminum foils could have excellent utility as a carrier web. Similarly the coated or laminated textiles as in (c) above could be laminated between metal foils to provide a metal surfaced, dimensionally stable high temperature carrier with excellent toughness (tear resistance) to improve durability in use, compliance to roll and metering surfaces in the equipment, while offering excellent strippability and fluid wettability.

Also of interest are multilayer films of polymeric alloys or combinations of alloys including thermoplastic and elastomeric polymers.

The carrier web also can be a metallic belt. A preferred metal is stainless steel polished to a specific surface smoothness to maintain sufficient adhesion to hold the in-process film to the carrier web, but not so rough as to provide an anchorage which could prevent stripping entirely or lead to distortion of the film during stripping. Aluminum foils are also useful as a carrier web, but are less satisfactory than stainless steel for several reasons: they are quickly annealed during high temperature fusing of the applied polymers and, therefore, readily damaged in subsequent use. They are also prone to creasing or wrinkling in-process and susceptible to chemical modification of their surfaces by the aqueous ammoniacal solutions characteristic of many fluoropolymer dispersions. Metallic belts such as stainless steel carrier are sometimes fully tempered and relatively stiff for tracking purposes. This results in a carrier with sufficient stored mechanical energy under tension that line speed should be maintained at about 1-2.5 m/min. (3 to 8 fpm). Steel belts for this use are about 125-200 μm (5 to 8 mil).

The liquid media can be any generally low viscosity liquids capable of forming casting fluids for the protective layer and the second polymeric layer. The fluoropolymer for the protective layer normally is a particulate that is uniformly dispersed in the liquid medium to form a casting fluid suspension. Depending on composition, the casting fluid for the second polymeric layer may be dissolved or dispersed in the liquid media. Hence the casting fluid for this layer can be a solution or a dispersion as the case may be. The liquid media for the protective layer and second polymeric layer casting fluids may be different. In all circumstances, the liquid should not adversely affect the material of the carrier web or other process equipment. Non-toxic, non-corrosive, and environmentally benign substances are desirable. The preferred liquid is water.

The casting fluid for the protective layer can include low concentrations, i.e., less than about 15 wt. % of selected adjuvants such as pigments, light stabilizing additives and surface active agents, to name a few. The concentration of such adjuvants disclosed here is based upon the weight of polymer dispersed. Preferably the casting fluid will include surfactants such as Triton® X-100 (octylphenoxypolyethoxy ethanol) and fluorinated alkylpolyoxyethylene ethanol surfactants such as Fluorad® FC-170C from 3M.

In general, the concentration of polymer in the casting fluid influences the pick up of polymer on the carrier and thus controls the thickness of the dried product film. Typically, polymer buildup per application is associated with a "cracking thickness", i.e., the thickness above which the dried polymer layer tends to form so-called "mud-crack" type defects. Accordingly, to produce high quality layers at high linear carrier web rates, polymer concentration of the casting fluid should be controlled in a low range effective to maintain thickness below the cracking thickness. In an example of making the protective layer, a fluoropolymer concentration of about 60 wt. % produces a polymer buildup of about 9.4 μm (0.37 mil) per pass fluoropolymer. This buildup rate is near the cracking thickness. Polymer concentration maximizes production rate without reaching the cracking thickness for polymer suspensions and solutions used to make the second polymeric layer depend on the nature of the polymer utilized. Based on this disclosure, one of ordinary skill in the art can determine proper concentrations without undue experimentation.

It is desirable that the casting fluid thoroughly wets the carrier web so that the coating will be uniform. If wetting is insufficient, the casting fluid will form beads on the web. Wetting characteristics of the casting fluids may be controlled by adding surfactants that lower the surface tension of the casting fluid. Exemplary surfactants are fluorosurfactants, such as fluorinated alkylpolyoxyethylene ethanol surfactants e.g., Fluorad® FC-170C from 3M, or silicone-based surfactants such as Union Carbide's L-77. Surfactants such as these advantageously can be rapidly removed from the intermediate wet product on the carrier web by thermal decomposition, volatilization, or sublimation in the thermal processing zone of the equipment.

It is desirable, in general, to identify the most appropriate hydrocarbon surfactant(s) for any given casting fluid which in combination with relatively minor quantities of fluorosurfactants yields the desired result of high deposition rates (build per pass) without cracking, and facile decomposition, volatilization, or sublimation of non-polymeric additives. Since the maximum temperature desirable for film consolidation upon final fusion will depend upon the melting point of the specific polymers in the films, the optimum level and chemical nature of such surfactants can be different for various film compositions. Ionic additives other than the fluorosurfactants may be employed to advantage in casting fluids to engender a rapid increase in viscosity upon drying. These could include salts such as ammonium acetate, or other salts equally fugitive in the process, or salts such as potassium chlorate which can induce decolorization of the fused films at very minor levels.

The buildup of polymer per pass through the coating tower is largely dependent upon the concentration of the polymer in the casting fluid. In addition, according to the method of the invention, metering bars are used to enable a rapid linear travel of the carrier. In the process of the invention, the speed of the carrier web is limited essentially only by the length of the thermal processing zone in which the polymer is dried from its casting fluid and is fused to form an integrated film. That is, the carrier web cannot move so rapidly that drying does not occur within the drying zone provided and fusion within the fusing zone provided. The wiping action of the metering bars removes the excess casting fluid associated with high speed carrier web travel so that an uncracked deposit of dried resin may be obtained prior to final fusion of that deposit.

The selection of metering bars, however, is not trivial since it is undesirable to introduce shearing of the casting fluid sufficient to coagulate the polymer contained in the reservoir between the cavities of the metering bar and the moving carrier. The size and shape of the metering cavity is dependent upon the shear stability of each specific casting fluid. Additives to minimize polymer shearing by the metering bars may also be used in the casting formulations. For example, foaming at the metering bars over an extended period of time could introduce unacceptable shearing at the bars. This may be ameliorated by using an antifoam such as Dow-Corning FG-10, as well as fluorosurfactants such as 3M's Fluorad® FC-146 (perfluoroammonium octanoate). Since the casting fluids utilized in this invention can contain widely different polymers with particles of varying shear sensitivity, variable solids content, particle size, and surfactant systems, the selection of a bar geometry (cavity size and shape) specific to any given casting fluid is more difficult to model than to identify by trial and error. However, understanding of the operative parameters as disclosed herein permit the practitioner of ordinary skill in this art to select appropriate metering bars without undue experimentation Drying of the casting fluids and fusing of the polymer to form an integrated layer according to this invention occurs at a thermal gradient over a short time. For fluoropolymers which generally have high melting temperatures and poor melt flow characteristics, formation of an integrated film compares to sintering. Upon reaching a softening temperature, the polymer particles fuse with adjacent particles and thereby create a densified mass. Occasionally this film formation step is referred to as "consolidation" of the fluoropolymer. The polymers of the second polymeric layer generally form a film by being heated above their fusing points, flowing together and cooling to form a film. Temperature and duration are functions of the web speed and drying/fusing temperatures of the polymers. Preferably drying and fusion take place from about 0.25 to about 30 minutes and more preferably about 0.5-2.0 minutes. For the fluoropolymer casting fluid drying, film formation, and sintering temperatures are about 120-150° C. (250-300° F.), 260-325° C. (500-620° F.), and 360-400° C. (680-750° F.) respectively. For the second polymeric layer casting fluid, thermal process zone temperatures should be about 150-220° C. (300-430° F.).

EXAMPLES

This invention is now illustrated by examples of certain representative embodiments thereof, wherein all parts, proportions and percentages are by weight unless otherwise indicated. All units of weight and measure not originally obtained in SI units have been converted to SI units.

Example 1

A multilayer composite was produced using a single stage coating tower assembly similar to that illustrated in FIG. 6. A carrier web of Kapton® polyimide film from DuPont of 0.13 µm (0.005 inch) thick and 0.55 m (22 inches) wide was continuously drawn from a supply roll and passed at 4.9 m/min. (16 ft./min.) under a 5.1 cm (2 inch) diameter idler roll. The idler roll was submerged in a bath containing Fluon® AD1LN PTFE aqueous dispersion to which 0.5% Zonyl® FSO fluorosurfactant from DuPont had been added to modify the surface tension. The modified aqueous dispersion was diluted with deionized water to achieve a specific gravity of 1.38.

The carrier web was directed upward and thus emerged from the bath coated on both sides with the dispersion. Above the surface of the bath the dispersion-coated web passed between a pair of stationary Mayer-type metering rods of 12.7 mm (0.5 inch) diameter which were wound with 0.64 mm (0.025 inch) diameter wire. The rods were oriented parallel to the plane of the carrier web and perpendicular to the machine direction. The rods were positioned about 5.1 cm (2 inches) apart vertically and the centerlines were offset horizontally by about 7.6 mm (0.3 inches) such that opposite sides of the film contacted different rods and such that the film was deflected in an S-shaped profile path. The wet carrier web was next directed upward through a 2.8 m (6 foot) long drying zone of air at 120° C. which dried the dispersion completely to a coalesced film of PTFE without causing blisters, cracks, irregularities or other defects in the film. The film-bearing carrier web was next moved through a 2.8 m (6 foot) long fusing zone of air heated to 332° C. supplemented with radiant heaters at 649° C. located at 15 cm (6 inches) from each side of the web. The fusing operation removed residual surfactant and caused the coalesced PTFE particles in the film to sinter and thereby form a continuous layer of about 5.1-7.6 µm (0.0002-0.0003 inch) thickness PTFE on each side of the carrier web.

The PTFE-coated carrier web from the first pass through the coating tower was wound onto a take-up roll and moved to the supply roll position. The above-described process was repeated which resulted in a build up of a PTFE film thickness of about 12.7 µm (0.0005 inch) on each side of the web. The carrier web was wound up and reprocessed as before two additional times to provide PTFE films of 25.4 µm (0.001 inch) thickness.

The carrier web was again wound up on a roll and moved to the supply position of the coating tower. The coating step was repeated as in the previous passes except that (a) the aqueous dispersion in the bath was a mixture of 17.5 parts by weight ("pbw") DuPont FEP TE-9503 fluorinated ethylene propylene copolymer ("FEP"), 35.5 pbw Ludox® LS 30 colloidal silica dispersion from W.R. Grace Company, and 4.6 pbw Triton® X-100 nonionic surfactant, all of which were diluted with deionized water to achieve a specific gravity of 1.13, (b) the carrier web speed was 3.7 m/min. (12 ft./min), and (c) the air temperature in the fusing zone was 324° C. At conclusion of this pass the exposed faces of the fluoropolymer layers on the carrier web were rendered bondable by the presence of the embedded colloidal silica particles.

The coated carrier web was wound up on a roll and replaced at the supply roll position. The carrier web roll was unwound at 1.52 m/min. (5 ft./min.) and was immersed in the bath which had been replaced by a liquid silicone rubber ("LSR") formulation of 50 pbw of 9252-500P Part A and 50 pbw 9252-500P Part B LSR from Dow Corning Corporation in which Part A contained a platinum catalyst and Part B contained crosslinking agent and a cure inhibitor capable of being removed by application of heat. The formulation additionally contained 12 pbw of DTCOLOR K-71848 red pigment concentrate (Dispersion Technology, Inc., Lakewood, N.J.) of 35% iron oxide and 65% vinyl-terminated silicone polymer. The formulation had a viscosity of 50 Pa·s (50,000 cps) as measured with a Brookfield RV viscometer using a No. 6 spindle at 10 rpm.

The carrier web which was wet with LSR was drawn upward from the bath and between two horizontally disposed steel rods of 5.1 cm (2 inch) diameter clamped with a clearance between them of 0.38 mm (0.015 inch). The thickness of the LSR coating on each face of the carrier web after passing between the rods was 0.08 mm (0.003 inch). Directly following the rods, the carrier web entered a reinforcement application section consisting of another pair of horizontal 5.1 cm (2 inch) diameter rods. These rods were spring-loaded to bias against each other with a force per inch of length of 0.35 N/cm (0.2 lbsf/in) and were free to move horizontally apart as necessary to accommodate the web which passed between them. As the carrier entered the nip between the spring-loaded rods, separate stitch-bonded nonwoven polyester fabric reinforcement webs were unwound from supply rolls and introduced cocurrently on each side of the carrier web between the exposed face of the LSR and the spring-loaded bar. The fabric had a weight of 0.10 kg/m$^2$ (3.0 oz./yd.$^2$) and was identified as "Supreme 3-18 Gauge" product from Superior Fabrics, Inc., Pompano Beach, Fla. Thus the spring-loaded rods pressed the fabrics into the uncured LSR coatings such that the fabric was partially embedded into the coating, (i.e., the inboard face of the fabric was fully impregnated with LSR and the outboard face was substantially free of LSR.). The coated carrier web continued to move upward through a 3.7 m (12 foot) long hot air zone maintained at 177° C. (without application of supplemental radiant heat). In the hot air zone the cure inhibitor was thermally decomposed and/or volatilized which freed the catalyst to cause the LSR to crosslink. Consequently, the silicone rubber layer had cured and was bonded to the fluoropolymer layer, and the fabric was affixed to the exposed face of the silicone rubber layer. The composites on each side of the carrier web were then pulled away from the carrier and were wound up on separate rolls.

Process variables and physical properties of the composite are presented in Table I. The product was an asymmetric flexible composite that had soft hand and exceptional tear resistance. Tear resistance was so great that the fluoropolymer, silicone rubber and fabric layers could not be peeled apart at their interfaces without destroying the web.

Examples 2-5

Composites were manufactured similarly to the procedure of Example 1 as described more fully below. Selected conditions for making each sample and product physical properties are shown in Table I.

In Example 2, the procedure of Ex. 1 was followed except that the reinforcement fabric was Ahlstrom product 3257 (Ahlstrom Filtration Specialties, Mt. Holly Springs, Pa.) and the gap between the rods for metering the LSR pick up was 0.2 mm (0.008 inch) which caused a pick up of 0.038 mm of LSR. Due to the relative thicknesses of the LSR and the reinforcement, the latter was fully embedded within the second polymeric layer, (i.e., both inboard and outboard faces of the fabric were impregnated with LSR). After removal from the carrier web, the exposed face of the protective layer was smooth and glossy, and the exposed face of the second polymeric layer was slightly textured due to the presence of the reinforcement just beneath the surface.

In Example 3, the procedure of Ex. 2 with the following differences. A woven glass fiber fabric of industry standard style 1080 (BGF Industries, Greensboro, N.C.) with a carmelized (i.e., continuous heat-cleaned) finish and weight of 0.047 kg/m$^2$ (1.38 ounces/sq. yd.) was used for the reinforcement layer material. The reinforcement was fully embedded within the second polymeric layer of LSR.

In Example 4, the procedure of Ex. 3 was repeated except that the reinforcement layer material was industry style 2116 glass fiber fabric. The reinforcement was fully embedded within the second polymeric layer.

Example 5 was the same as Ex. 3 except that the reinforcement layer material was industry style 7628 fabric that had a batch, heat-cleaned finish and which was fully embedded in the second polymeric layer.

TABLE I

|  | Ex. 1 | Ex. 2 | Ex. 3 | Ex. 4 | Ex. 5 |
| --- | --- | --- | --- | --- | --- |
| Reinforcement: | | | | | |
| Composition | polyester | polyester | glass style 1080 | glass style 2116 | glass style 7628 |
| Structure | Stitch-bonded | Spun-bonded | plain weave | plain weave | plain weave |
| Finish | — | — | carmelized | carmelized | batch heat-cleaned |
| Weight (kg/m$^2$) | 0.10 | 0.034 | 0.047 | 0.10 | 0.20 |
| Protective Layer: | | | | | |
| Composition | PTFE | PTFE | PTFE | PTFE | PTFE |
| Thickness (μm) | 28 | 28 | 28 | 28 | 28 |

TABLE I-continued

|  | Ex. 1 | Ex. 2 | Ex. 3 | Ex. 4 | Ex. 5 |
|---|---|---|---|---|---|
| Second Polymer: | | | | | |
| Composition | LSR (I) | LSR (I) | LSR (I) | LSR (I) | LSR (I) |
| Thickness (μm) | 80 | 38 | | | |
| Composite | | | | | |
| Thickness (μm) | 430 | 130 | 170 | 190 | 320 |
| Weight (kg/m$^2$) | 0.24 | 0.17 | 0.25 | 0.28 | 0.45 |
| Break Strength[c] | | | | | |
| MD[a] (N/m) | 10,300 | 2,600 | 20,700 | 26,800 | 30,800 |
| XD[b] (N/m) | 2,800 | 1,600 | 13,100 | 27,800 | 25,900 |
| Trapezoidal tear strength | | | | | |
| MD (N) | 111 | 21 | 23 | 32 | 44 |
| XD (N) | 102 | 26 | 12 | 26 | 20 |

[a]Machine Direction
[b]Cross Machine Direction
[c]Gage length 7.6 cm, crosshead speed 5.1 cm/min., extension rate 0.67 cm/cm · min.

Examples 6-10

A number of multilayer composites were manufactured according to this invention in a fashion similar to the procedure of the preceding examples in which different LSR compositions were utilized. Selected process conditions and product physical properties are shown in Table II. Table III describes the LSR compositions used in the examples.

In Example 6 the procedure of example 2 was repeated except that the reinforcement material was a plain weave fabric of style 89 glass fiber and the liquid silicone rubber (LSR) composition was (II) (see Table III). The reinforcement was fully embedded within the translucent LSR second polymeric layer.

Example 7 was produced identically to Ex. 6 except that the LSR composition (IV) was used. The resulting LSR second polymeric layer was fire resistant due to a fire retardant agent included in the LSR composition by the supplier.

Example 8 was the same as Ex. 7 except that the reinforcement layer was a polyester plain weave fabric manufactured by Obeikan Saint-Gobain, Glendale, Calif., of 0.19 kg/m$^2$ (5.7 oz/yd.$^2$) weight, and 279 μm (0.011 in.) thickness.

In Example 9 the procedure was the same as Ex. 5 to the point at which the style 7628 glass fabric was laid into the wet, uncured LSR such that the reinforcement material was fully immersed in the uncured LSR and some LSR flowed to the exposed faces of the two laminate intermediate structures on opposite sides of the carrier. Then the intermediate entered a second nip formed by freely-rotating 12.7 cm (5 inch) diameter, horizontal aluminum rollers. The rollers were pressed against each other with a force per length of 0.35 N/cm (0.2 lbf/in). A stock of 28 μm (0.001 in) thick cast PTFE film with one film face having been treated to render it bondable (DF-1100 1.1 mil natural B/1, Saint-Gobain Performance Plastics Corporation, Merrimack, N.H.) was introduced concurrently between the freely-rotating rollers and the exposed wet surfaces of the intermediate structures on each face of the carrier. The treated face of the PTFE film was thus pressed against the wet LSR. The laminate components having outer faces covered with the 28 μm PTFE films, continued to move upward into the curing oven. The LSR was cured and the two laminates were stripped from the carrier as in Ex. 5 to produce laminates in which the fabric reinforced silicone rubber internal layer was sandwiched between and bonded to two PTFE film layers.

Example 10 was made similar to Ex. 1, except that a polyester tricot knit reinforcement material was used and the reinforcement material was applied manually by the following method. After the final layers of fluorinated ethylene propylene copolymer containing embedded colloidal silica particles had been fused to both sides of the polyimide carrier web, a 0.91 m (36 in.) length by 0.55 m (22 in.) long sheet was cut from this intermediate product. One narrow end of the sheet was threaded horizontally through a gap formed by two parallel 51 cm (2.0 in) diameter polished steel rods disposed one above the other. The rods were separated by shims to a 0.25 mm (0.010 in.) thick metering gap. With a narrow strip of the sheet extending through the gap, the top surface of the sheet on opposite side of the rods was painted with an excess of LSR composition (I). The sheet was grasped by the dry, narrow strip and drawn by hand through the gap at a rate of about 2 m/min. (7.5 ft./min.). The top surface of the sheet was thus covered with a uniform layer of uncured LSR 0.076 mm (0.003 in.) thick.

The coated sheet was laid on a plate glass surface with the uncured LSR side facing up. A piece slightly larger than the coated sheet of 0.19 mm (0.0075 in.) thick of tricot knit fabric weighing 0.03 kg/m$^2$ (4.4 oz/yd.$^2$) was laid onto the uncured silicone. The knit fabric was formed of a 20 denier/1 filament polyester fiber with melamine finish available as Pattern 42639 from Native Textiles, New York, N.Y. This composite was compressed manually using a 5.1 cm (2.0 in.) diameter steel rod weighing 27.2 kg (60 lb.) which was rolled over the fabric. The fabric was pressed into but not fully submerged in the LSR layer because the fabric was approximately twice the thickness of the LSR layer and resistant to compaction by the weight of the rod. Consequently, the LSR did not bleed through to the exposed top surface of the reinforcement layer. The intermediate product was then placed on the conveyor belt of a screen-print drying tunnel oven and was carried through a 1.82 m (6.0 ft.) long heating chamber operating at 200° C. (392° F.) at a speed of 0.46 m/min. (1.5 ft/min.). The sheet emerged from the oven with the LSR cured to a solid silicone rubber which formed a strong, flexible bond between the knit reinforcement and the PTFE film on the upper face of the sheet of carrier. The polyester knit/silicone rubber/PTFE film composite was then peeled away from the carrier web. The product was an asymmetric flexible composite with medium hand and exceptionally good tear resistance for a such a relatively thin, light-weight composition. The composite was characterized by a smooth fluoropolymer face on one side and low-friction, not rubber-contaminated polyester knit fabric on the other side.

TABLE II

|  | Ex. 6 | Ex. 7 | Ex. 8 | Ex. 9 | Ex. 10 |
|---|---|---|---|---|---|
| Reinforcement: |  |  |  |  |  |
| Composition | glass style 89 | glass style 98 | Obeikan polyester | glass style 7628 | Polyester |
| Structure | plain weave | plain weave | plain weave | plain weave | tricot knit |
| Finish | carmelized | carmelized | — | carmelized | melamine |
| Weight (kg/m$^2$) | 0.43 | 0.43 | 0.19 | 0.20 | 0.03 |
| Protective Layer: |  |  |  |  |  |
| Composition | PTFE | PTFE | PTFE | PTFE | PTFE |
| Thickness (μm) | 28 | 28 | 28 | 28 | 28 |
| Second Polymer: |  |  |  |  |  |
| Composition | LSR (II) | LSR (IV) | LSR (IV) | LSR (III) | LSR (I) |
| Thickness (μm) |  |  |  |  | 76 |
| Composite |  |  |  |  |  |
| Thickness (μm) | 660 | 740 | 610 | 510 | 190 |
| Weight (kg/m$^2$) | 0.92 | 1.02 | 0.60 | 0.53 | 0.15 |
| Break Strength$^c$ |  |  |  |  |  |
| MD$^a$ (N/m) | 48,700 | 76,200 | 40,500 | 32,600 | 28,000 |
| XD$^b$ (N/m) | 44,000 | 63,200 | 43,300 | 28,400 | 27,000 |
| Flex-fold retention$^d$ |  |  |  |  |  |
| MD (%) | 99 | 347 | 100 | 7 | — |
| XD (%) | 91 | 316 | 99 | 12 | — |
| Trapezoidal tear strength |  |  |  |  |  |
| MD (N) | 280 | 93 | 40 | 36 | 19 |
| XD (N) | 276 | 86 | 512 | 22 | 27 |

$^a$Machine Direction
$^b$Cross Machine Direction
$^c$Gage length 7.6 cm, crosshead speed 5.1 cm/min., extension rate 0.67 cm/cm · min.
$^d$% breaking strength retained after folding a 5.1 cm wide specimen and pressing

TABLE III

|  | I | II | III | IV |
|---|---|---|---|---|
| Dow Corning 9252-500P A (pbw) | 50 | — | — | — |
| Dow Corning 9252-500P B (pbw) | 50 | — | — | — |
| Wacker$^e$ LR-6289 A (pbw) | — | 50 | 50 | — |
| Wacker LR-6289 B (pbw) | — | 50 | 50 | — |
| Wacker LR-6293 A (pbw) | — | — | — | 50 |
| Wacker LR-6293 B (pbw) | — | — | — | 50 |
| Dtcolor K71848 pigment concentrate (pbw) | 12 | — | 12 | — |

$^e$Wacker Silicones, Adrian, Michigan

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for making a multilayer composite comprising (A) providing a uniform dispersion in a liquid medium the dispersion comprising particles of a fluoropolymer having a fusing temperature, (B) depositing the dispersion onto a carrier web of a material that is thermally stable above the fusing temperature, (C) heating the carrier web coated with the dispersion to a temperature above a temperature effective to remove the liquid medium for a duration effective to remove the liquid medium and to a temperature above the fusing temperature to form a continuous, uniform thickness, protective layer of fluoropolymer film on the carrier web of which the protective layer has an inboard face adjacent to the web and an outboard face opposite the carrier web, (D) optionally applying additional dispersion onto the outboard face and heating the web and dispersion to a temperature above the fusing temperature for a duration effective to remove additional liquid medium and to build up thickness of the film of the protective layer, (E) optionally repeating step (D) until the protective layer is a preselected thickness, (F) treating the protective layer such that the outboard face is bondable to a polymer free of fluoropolymer, (G) while maintaining the inboard face of the protective layer in contact with the carrier web, applying to the outboard face a second polymeric layer of a composition substantially free of fluoropolymer, (H) bonding the second polymeric layer to the outboard face of the protective layer, thereby forming a multilayer composite of the protective layer bonded to the second polymeric layer, (I) adding to the second polymeric layer a reinforcement layer of a film, woven fabric, nonwoven fabric or combination thereof, and (J) peeling the multilayer composite from the carrier web.

2. The process of claim 1 in which the thickness of the protective layer is about 5-51 μm (0.2 -2 mil).

3. The process of claim 1 in which the treating step comprises chemically etching the outboard face effectively to render the outboard face bondable to the second polymeric layer.

4. The process of claim 1 in which the treating step comprises embedding colloidal silica particles in the outboard face such that the colloidal silica particles are capable of forming chemical bonds between the protective layer and the second polymeric layer.

5. The process of claim 4 in which the carrier web is a film comprising polyimide or a copolyimide.

6. The process of claim 1 which further comprises depositing the dispersion on a carrier web having a smoothness effective such that after the peeling step the inboard face has a 750° gloss value greater than about 50 gloss units as determined by ASTM D 3679-86.

7. The process of claim 1 in which the carrier web has two sides and the process comprises carrying out steps (B)-(I) simultaneously on both of the two sides, thereby forming two multilayer composites at once.

8. The process of claim 1 in which the applying and bonding steps respectively comprise placing a curable liquid elastomer on the outboard face of the protective layer and curing the liquid elastomer, thereby forming the second polymeric layer affixed to the protective layer.

9. The process of claim 8 in which the protective layer comprises a homopolymer or copolymer of tetrafluoroethylene and the curable liquid elastomer comprises a liquid silicone rubber.

10. The process of claim 8 in which the adding step comprises embedding the reinforcement layer within the second polymeric layer prior to curing the liquid elastomer.

11. The process of claim 8 in which the second polymeric layer defines an exposed face and the adding step comprises affixing the reinforcement layer onto the exposed face prior to curing the liquid elastomer such that after the curing step the reinforcement layer has one side that extends outward from the second polymeric layer which side is free of the composition of the second polymeric layer.

* * * * *